Figure 1:
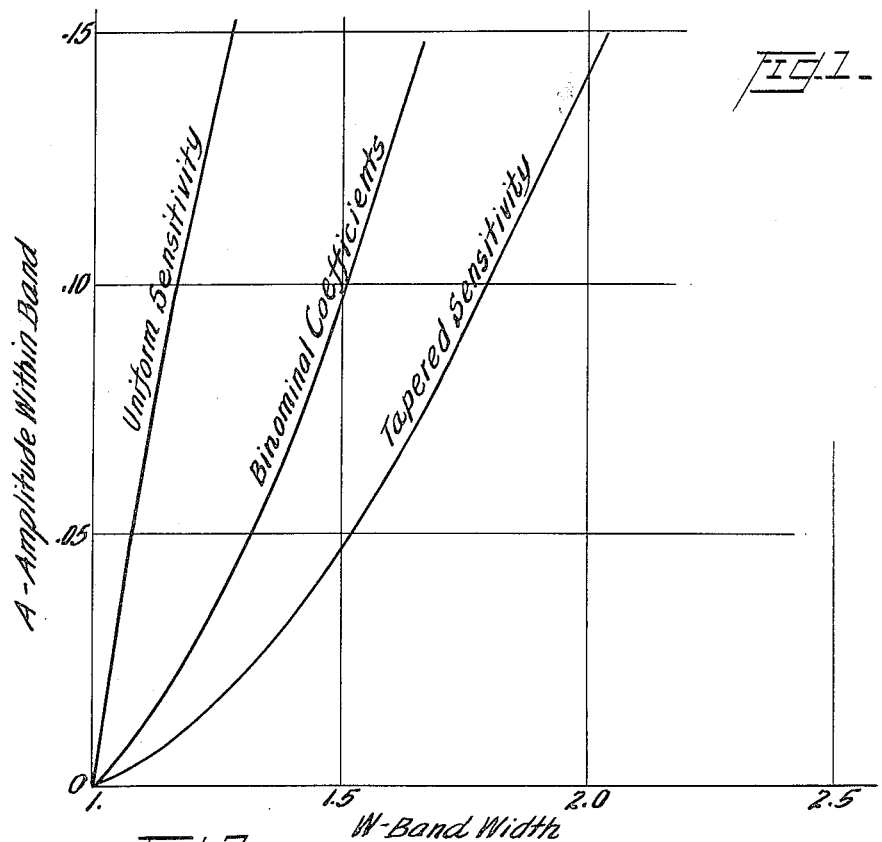

Jan. 4, 1955 J. O. PARR, JR 2,698,927
SEISMIC SURVEYING
Filed July 13, 1953 2 Sheets-Sheet 1

Inventor
J. O. Parr, Jr.
BY Watson, Cole, Grindle & Watson
ATTORNEYS

Jan. 4, 1955  J. O. PARR, JR  2,698,927
SEISMIC SURVEYING
Filed July 13, 1953  2 Sheets—Sheet 2
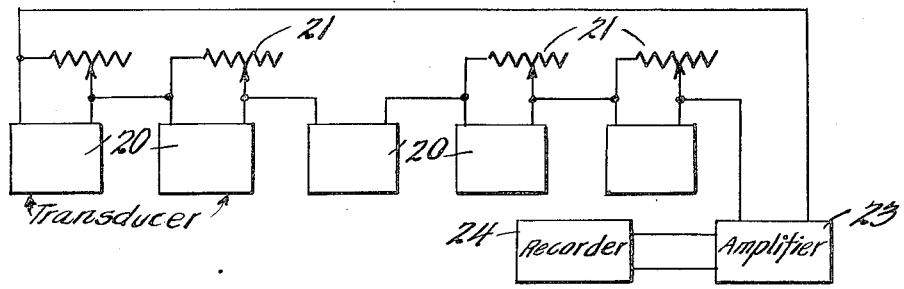
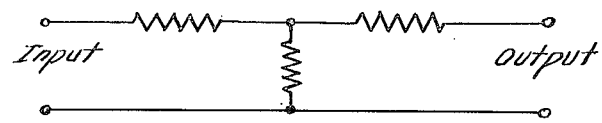
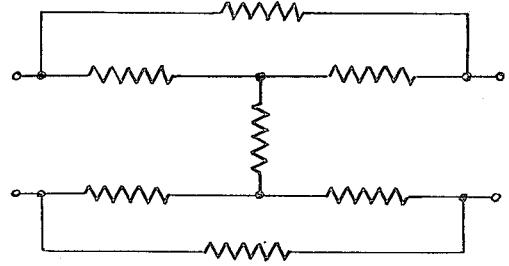
INVENTOR
Josephus O. Parr, Jr.,
BY Watson, Cole, Grindle & Watson
ATTORNEYS

United States Patent Office 2,698,927
Patented Jan. 4, 1955

2,698,927

SEISMIC SURVEYING

Josephus Overton Parr, Jr., San Antonio, Tex., assignor to Olive S. Petty, San Antonio, Tex.

Application July 13, 1953, Serial No. 367,490

13 Claims. (Cl. 340—15)

This invention relates to improvements in methods for the transmission, reception, and reproduction of waveform signals, and has as its principal object the reduction in magnitude of unwanted vibrational energy. The invention finds its principal application in the field of seismic exploration, in which the elimination or attenuation of persistent vibrations arriving at the seismic detectors or transducers in a generally horizontal direction is a serious problem, frequently obscuring the record of the wanted reflected or refracted wave energy. Many attempts have been made to eliminate or reduce the magnitude of unwanted random and surface energy and considerable improvement has been effected in the results obtained in certain areas, but the prior methods are usually far less than satisfactory.

For instance, it is a common expedient in the seismic field to composite the energy arriving at a group of spaced transducers by combining the transducer outputs, and amplifying the combined outputs to provide a single trace, the transducers being so arranged that the horizontally propagated energy arrives at the different transducers in out-of-phase relation, so that the resultant outputs substantially cancel, or are attenuated as to such energy. Unfortunately, reasonably effective cancellation or attenuation is often not obtained by this method, because the unwanted energy is of varying wave lengths, and often arrives at the transducers from random directions as the result of reflection or refraction in the surface formation. Thus the combined energy in any transducer pattern is ordinarily characterized by energy peaks over a continuous band of wave lengths, and these peaks tend to obscure the wanted signal. So far as I am aware, little progress has been made, prior to my invention, toward reduction in amplitude of peaks of unwanted energy over a finite band of wave lengths.

It has been proposed, for example, to secure more effective suppression of unwanted energy in a sound system by the use of a plurality of microphones, arranged in a line and having their outputs combined in opposed phase relation, by adjusting the relative sensitivity or response of the microphones to conform substantially with the values of coefficients of the binomial expansion of $(1-z)^{N-1}S$, in which N equals the total number of microphones and S equals the sensitivity of the first microphone. I have further discovered that the sensitivity values to which the transducers of less sensitivity should be adjusted, in order to effect suppression of unwanted energy over a band of wave lengths, lie between the values expressed by the binomial expansion and the value of unity, or equal sensitivity.

In pursuance of this discovery, I have evolved a series of formulae for determining the relative sensitivity values to apply to a group of transducers arranged in a row, or a series of rows, to the end that effective rejection of unwanted energy can be obtained over any desired band width by combining the transducer outputs. For convenience, I refer herein to the method of my invention as involving "tapered sensitivity" of transducers, since the sensitivity of the transducers in a given group is ordinarily reduced toward either end from a central point, where the transducers are in a row. Alternatively, when some pattern other than a linear arrangement of transducers is employed, essentially similar tapering of transducer sensitivity is established, due allowance being made for the nature of the pattern and the location of the transducers with respect to each other and to the source of the disturbing energy. The term "band width" is employed herein, as a measure of the range of wave lengths over which energy peaks are to be reduced, regardless of absolute value of wave length. For this purpose I have arbitrarily defined the term "band width" as the ratio of the longest wave length to the shortest wave length in a given band. Thus, in a band width of 3, the shortest wave length in the band has a length one-third that of the longest wave length.

In general, the larger the number of transducers employed, the greater the reduction in unwanted energy which can be obtained by combining the outputs. It will be appreciated, however, that the use of excessively large numbers of transducers may be both expensive and troublesome, especially where, as in the seismic field, the location of transducers must be repeatedly changed. With the application of my method of tapered sensitivities, I have been able to achieve improved efficiency in the recording of wanted signal energy while, at the same time, substantially reducing the total number of transducers employed for each trace.

It is a further feature of the instant invention that suppression or reduction in amplitude of peaks of unwanted energy to a minimum value over a substantial band width may be effected. As might be expected, the narrower the band width, the greater the reduction which can be achieved by the practice of my method. It is desirable, therefore, to determine in advance, by taking preliminary records or otherwise, the band width which should be suppressed in order that a sufficient number of transducers may be employed to permit efficient reproduction of wanted signal energy.

In the preferred practice of my invention, the relative value of sensitivity for the several transducers in a group to be combined are preferably determined precisely from the formulae set out hereinafter. It will be understood, however, that substantial improvement in the transmission and reception of waveform signal energy may be achieved by the adoption of sensitivity values different from the exact values whereby optimum results are achieved. Such variation in sensitivity values is contemplated as part of the instant invention, providing that the selected values (with certain exceptions hereinafter discussed) lie within the limits defined on the one hand by binomial coefficients as explained hereinbefore, and on the other hand by unity, or uniform sensitivity. Such intermediate values, when employed in a system in which the sensitivity of the transducers increases from the outermost transducers toward the center of a row, result in more effective suppression over a wave band than can be achieved by adoption of the values defined at either of these extremes.

Figure 2:
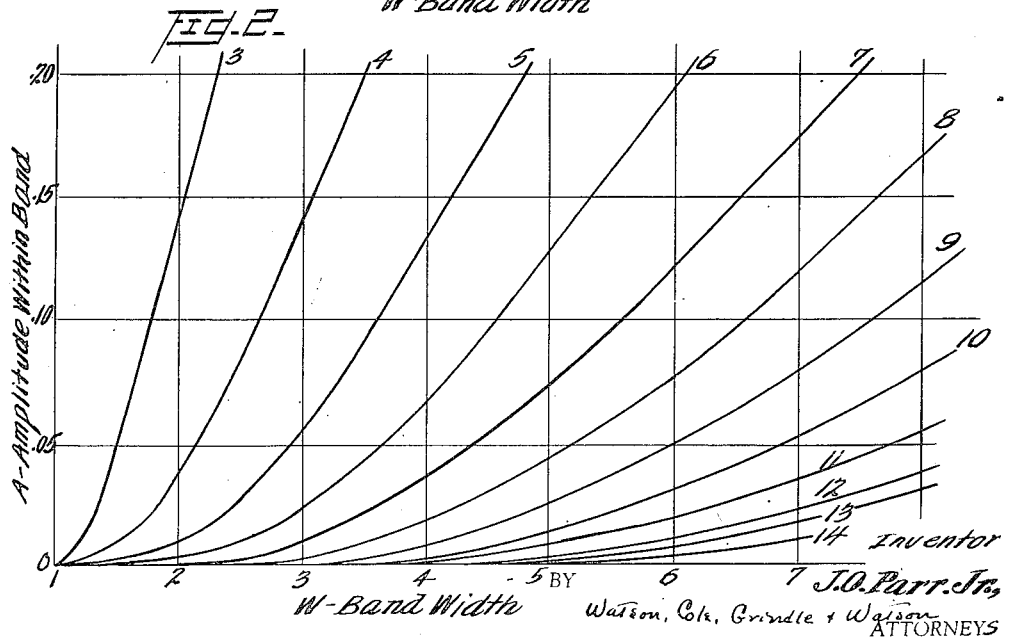

The method of the instant invention, and the results achieved thereby, are illustrated in the accompanying drawings, in which Figure 1 is a graphical representation illustrating the comparative effect of combining the output of a plurality of transducers when different relative sensitivity values are employed, the band width being plotted against maximum amplitude in the attenuated band;

Figure 2 is a graphical representation showing the effect of combining the outputs of different numbers of transducers, the sensitivity of the transducers of each combined group being related as proposed herein; and Figures 3, 4 and 5 are circuit diagrams illustrating the use of attenuating devices for obtaining proper relative sensitivity of a plurality of transducers.

In the following detailed description of the preferred method of the invention, and more especially in the presentation of the formulae, the following symbols are employed:

$N$ = the number of transducers in a line of which the outputs are combined.

$D$ = distance between the effective centers of adjacent transducers in the group.

$L$ = wave length of received energy.

$R$ = ratio of combined transducer output when spaced in the selected pattern to the combined output which would result by locating all of the transducers at the same reference point, for any given value of L.

$s_1, s_2, s_3$, etc. = the respective sensitivities of transducers arranged in a straight line where $s_1$ represents the outermost transducers, $s_2$ the next adjacent transducers, etc., the central transducer (or central pair of transducers) having a sensitivity represented by 1.

$n$ = the numerical order of a given transducer in a group arranged in a straight line, proceeding from the outer ends of the line toward the center. Thus, for the transducers at each end of the line, $n=1$, for the next adjacent transducers, $n=2$, etc.

$x = (N-1)\frac{s_1}{s_2}$, a convenient arbitrary function.

$W$ = band width, i. e., ratio between longest and shortest waves in a given band.

$A$ = maximum value of $R$ within the selected band.

It will be observed that, for the purpose of simplifying the following explanations, certain assumptions have been made. Thus it is assumed that the transducers are arranged in a straight line; as is hereinafter explained, other patterns can be readily reduced to the equivalent straight line pattern. It is also assumed that the spacing between adjacent transducers is uniform, and that all transducers in a group are connected to give the same polarity. By the use of the symbols $R$ and $A$, the output of the group of transducers may be conveniently expressed as a percentage or as a decimal. On the basis of these and other assumptions, hereinafter discussed, the following equations may be derived.

GENERAL FORMULAE $$s_1 = \frac{x^{\frac{N-1}{2}}}{(N-1)b}$$

$$s_n = \frac{C}{b}$$

where:

$$C = x^{\frac{N-3}{2}} + \left[\frac{1}{1!}\right]\left[\frac{1}{2!}\right][n-2][N-n-1]x^{\frac{N-5}{2}} +$$

$$\left[\frac{1}{2!}\right]\left[\frac{1}{3!}\right][(n-2)(n-3)][(N-n-1)(N-n-2)]x^{\frac{N-7}{2}} +$$

$$\left[\frac{1}{3!}\right]\left[\frac{1}{4!}\right][(n-2)(n-3)(n-4)][(N-n-1)(N-n-2)(N-n-3)]x^{\frac{N-9}{2}} +$$

etc. to $n-1$ terms.

When $N$ is an odd number, $$b = x^{\frac{N-3}{2}} + \left(\frac{1}{1!}\right)\left(\frac{1}{2!}\right)\left(\frac{N-3}{2}\right)^2 x^{\frac{N-5}{2}} +$$

$$\left(\frac{1}{2!}\right)\left(\frac{1}{3!}\right)\left(\frac{N-3}{2}\right)^2\left(\frac{N-5}{2}\right)^2 x^{\frac{N-7}{2}} +$$

$$\left(\frac{1}{3!}\right)\left(\frac{1}{4!}\right)\left(\frac{N-3}{2}\right)^2\left(\frac{N-5}{2}\right)^2\left(\frac{N-7}{2}\right)^2 x^{\frac{N-9}{2}} +$$

etc. to $\frac{N-1}{2}$ terms.

When $N$ is an even number, $$b = x^{\frac{N-3}{2}} + \left(\frac{1}{1!}\right)\left(\frac{1}{2!}\right)\left(\frac{N-2}{2}\right)\left(\frac{N-4}{2}\right) x^{\frac{N-5}{2}} +$$

$$\left(\frac{1}{2!}\right)\left(\frac{1}{3!}\right)\left(\frac{N-2}{2}\right)\left(\frac{N-4}{2}\right)^2\left(\frac{N-6}{2}\right) x^{\frac{N-7}{2}} +$$

$$\left(\frac{1}{3!}\right)\left(\frac{1}{4!}\right)\left(\frac{N-2}{2}\right)\left(\frac{N-4}{2}\right)^2\left(\frac{N-6}{2}\right)^2\left(\frac{N-8}{2}\right) x^{\frac{N-9}{2}} +$$

etc. to $\frac{N-2}{2}$ terms.

It will be perceived that by the use of the foregoing formulae, an exact value for the sensitivity of any transducer in a group may be calculated; these values can be shown to give a strikingly greater attenuation of energy within a given band width, for any given number of transducers, than either uniform sensitivity or sensitivity values conforming to binomial coefficients. For the purpose of simplifying the application of these formulae to specific conditions, they may be reduced to the following, each being applicable to a specific number of transducers.

SPECIFIC FORMULAE

Where $$N = 3, \quad s = \frac{x}{2}$$

$$A = \frac{x-1}{x+1}$$

Similarly, $N = 4$ $$s = \frac{x}{3}$$

$$A = \frac{x-1}{x+3}\sqrt{\frac{x-1}{x}}$$

$N = 5$ $$s_1 = \frac{x^2}{2(2x+1)}$$

$$s_2 = \frac{2x}{2x+1}$$

$$A = \frac{(x-1)^2}{x^2+6x+1}$$

$N = 6$ $$s_1 = \frac{x^2}{5(x+1)}$$

$$s_2 = \frac{x}{x+1}$$

$$A = \frac{(x-1)^2}{x^2+10x+5}\sqrt{\frac{x-1}{x}}$$

$N = 7$ $$s_1 = \frac{x^3}{2K} \text{ where } K = 3x^2+6x+1$$

$$s_2 = \frac{3x^2}{K}$$

$$s_3 = \frac{3x(2x+3)}{2K}$$

$$A = \frac{(x-1)^3}{x^3+15x^2+15x+1}$$

$N = 8$ $$s_1 = \frac{x^3}{7K} \text{ where } K = x^2+3x+1$$

$$s_2 = \frac{x^2}{K}$$

$$s_3 = \frac{x(x+2)}{K}$$

$$A = \frac{(x-1)^3}{x^3+21x^2+35x+7}\sqrt{\frac{x-1}{x}}$$

$N = 9$ $$s_1 = \frac{x^4}{2K} \text{ where } K = 4x^3+18x^2+12x+1$$

$$s_2 = \frac{4x^3}{K}$$

$$s_3 = \frac{2x^2(2x+5)}{K}$$

$$s_4 = \frac{4x(x^2+4x+2)}{K}$$

$$A = \frac{(x-1)^4}{x^4+28x^3+70x^2+28x+1}$$

$N = 10$ $$s_1 = \frac{x^4}{9K} \text{ where } K = x^3+6x^2+6x+1$$

$$s_2 = \frac{x^3}{K}$$

$$s_3 = \frac{x^2(x+3)}{K}$$

$$s_4 = \frac{x(3x^2+15x+10)}{3K}$$

$$A = \frac{(x-1)^4}{x^4+36x^3+126x^2+84x+9} \sqrt{\frac{x-1}{x}}$$

$N=11 \quad s_1 = \frac{x^5}{2K}$ where $K = 5x^4+40x^3+60x^2+20x+1$ $$s_2 = \frac{5x^4}{K}$$

$$s_3 = \frac{5x^3(2x+7)}{2K}$$

$$s_4 = \frac{5x^2(x^2+6x+5)}{K}$$

$$s_5 = \frac{5x(2x^3+15x^2+20x+5)}{2K}$$

$$A = \frac{(x-1)^5}{x^5+45x^4+210x^3+210x^2+45x+1}$$

$N=12 \quad s_1 = \frac{x^5}{11K}$ where $K = x^4+10x^3+20x^2+10x+1$ $$s_2 = \frac{x^4}{K}$$

$$s_3 = \frac{x^3(x+4)}{K}$$

$$s_4 = \frac{x^2(x^2+7x+7)}{K}$$

$$s_5 = \frac{x(x^3+9x^2+15x+5)}{K}$$

$$A = \frac{(x-1)^5}{x^5+55x^4+330x^3+462x^2+165x+11} \sqrt{\frac{x-1}{x}}$$

$N=13 \quad s_1 = \frac{x^6}{2K}$ where $K = 6x^5+75x^4+200x^3+150x^2+30x+1$ $$s_2 = \frac{6x^5}{K}$$

$$s_3 = \frac{3x^4(2x+9)}{K}$$

$$s_4 = \frac{2x^3(3x^2+24x+28)}{K}$$

$$s_5 = \frac{3x^2(4x^3+42x^2+84x+35)}{2K}$$

$$s_6 = \frac{6x(x^4+12x^3+30x^2+20x+3)}{K}$$

$$A = \frac{(x-1)^6}{x^6+66x^5+495x^4+924x^3+495x^2+66x+1}$$

$N=14 \quad s_1 = \frac{x^6}{13K}$ where $K = x^5+15x^4+50x^3+50x^2+15x+1$ $$s_2 = \frac{x^5}{K}$$

$$s_3 = \frac{x^4(x+5)}{K}$$

$$s_4 = \frac{x^3(x^2+9x+12)}{K}$$

$$s_5 = \frac{x^2(x^3+12x^2+28x+14)}{K}$$

$$s_6 = \frac{x(x^4+14x^3+42x^2+35x+7)}{K}$$

$$A = \frac{(x-1)^6}{x^6+78x^5+715x^4+1716x^3+1287x^2+286x+13} \sqrt{\frac{x-1}{x}}$$

$N=15 \quad s_1 = \frac{x^7}{2K}$ where $K = 7x^6+126x^5+525x^4+700x^3+315x^2+42x+1$ $$s_2 = \frac{7x^6}{K}$$

$$s_3 = \frac{7x^5(2x+11)}{2K}$$

$$s_4 = \frac{7x^4(x^2+10x+15)}{K}$$

$$s_5 = \frac{7x^3(2x^3+27x^2+72x+42)}{2K}$$

$$s_6 = \frac{7x^2(x^4+16x^3+56x^2+56x+14)}{K}$$

$$s_7 = \frac{7x(2x^5+35x^4+140x^3+175x^2+70x+7)}{2K}$$

$$A = \frac{(x-1)^7}{x^7+91x^6+1001x^5+3003x^4+3003x^3+1001x^2+91x+1}$$

$N=16 \quad s_1 = \frac{x^7}{15K}$ where $K = x^6+21x^5+105x^4+175x^3+105x^2+21x+1$ $$s_2 = \frac{x^6}{K}$$

$$s_3 = \frac{x^5(x+6)}{K}$$

$$s_4 = \frac{x^4(3x^2+33x+55)}{3K}$$

$$s_5 = \frac{x^3(x^3+15x^2+45x+30)}{K}$$

$$s_6 = \frac{x^2(5x^4+90x^3+360x^2+420x+126)}{5K}$$

$$s_7 = \frac{x(3x^5+60x^4+280x^3+420x^2+210x+28)}{3K}$$

$$A = \frac{(x-1)^7}{x^7+105x^6+1365x^5+5005x^4+6435x^3+3003x^2+455x+15} \sqrt{\frac{x-1}{x}}$$

The relative sensitivity of the several transducers in a group may be adjusted to the desired value in any number of different ways, and the precise method employed is not material so far as the present invention is concerned. I prefer to employ attenuation devices interposed in the line connecting each transducer with amplifier, for example as shown in Figure 3, since this method simplifies the replacement of improperly functioning units and affords accurate adjustment over a wide range. For this method a wide variety of attenuating networks can be employed, such as, for instance, as the networks shown in Figures 4 and 5; in these figures, the transducers are represented at 20 and the resistors at 21, and an amplifier and a recorder are shown conventionally at 23 and 24, respectively.

Another obvious method is the adjustment of sensitivity in the transducer itself. Thus, if the detector is of the type illustrated and described in the patent to Petty, 2,348,225, granted May 9, 1944, the sensitivity may be readily adjusted by varying the air gap 58 between the armature 45 and the pole piece 40, as described in column 1 on page 3 of the patent. Another convenient method of adjustment is the variation of the strength of the magnet commonly employed in transducers of conventional design. Various other methods will suggest themselves to those skilled in the art.

In lieu of an adjustment of individual seismometers, any one seismometer of a group may be replaced by a plurality of seismometers, sufficient in number to increase the response at that point by the necessary amount. For instance, if the sensitivity of a row of four seismometers is required to be adjusted so as to establish the ratio represented by 1-2-2-1, it is obvious that essentially the desired result may be achieved by using six seismometers of equal sensitivity, two seismometers being combined at each of the inner locations and a single seismometer being used at each of the outer locations of the row. Such an obvious expedient is considered, for the purpose of this application, to constitute a method of adjusting the sensitivity.

In the preferred practice of the invention in a particular area, in which suitable records are not available, it is desirable to take test records to determine the maximum and minimum wave lengths of the continuous band of wave lengths in which attenuation is desired, and also to determine the required degree of attenuation. For this purpose, I prefer to employ a plurality of transducers closely spaced (for instance, 2 feet to 10 feet), arranged in two lines at right angles with the point of intersection adjacent the midpoint of each line, the shot point being located in an extension of one of the lines of transducers. From the records so obtained, one skilled in the art of seismic surveying can readily determine the degree of attenuation and the limits of the band over which attenuation is desirable or necessary. Alternatively, these values may be determined on the basis of previous experience in the area to be explored, or may be arbitrarily selected on the basis of general experience, and the selection of the band and the degree of attenuation therein constitutes, obviously, no essential part of the instant invention.

Having determined the maximum and minimum wave lengths of the band to be attenuated, the calculated ratio then constitutes the band width W as defined hereinbefore and employed in the foregoing formulae. The maximum value of R within the selected band, designated A in the foregoing formulae, is determined merely from an inspection of test or previously taken records, and the number of transducers required for the desired attenuation over the selected band may be determined roughly from an inspection of Figure 2. For example, if a band of 3.0 is required and an attenuation to 6% is required in this band, five transducers would suffice. However, if an attenuation to 1% is required in this same band, seven transducers would be required.

Either by the use of the foregoing formulae, or of a curve such as may be plotted from the formulae for the selected number of transducers, the ratio of sensitivity of the several transducers may readily be determined.

Greatly improved results can be achieved even though the relative sensitivity of the several transducers in each group of which the outputs are to be combined is a substantial departure from the values as calculated by the foregoing formulae, as will be apparent from the following table, comparing the percentage amplitudes obtained when using the present system of tapered sensitivities as compared with systems employing transducers of uniform sensitivity and of relative sensitivity based on a system of binomial coefficients.

*Arrangement of transducers*

```
 o    o    o   o    o
s1   s2   1   s2   s1
```

| Type of Values | Sensitivities | | Percentage Amplitude if used on a Band Width of— | | | | |
|---|---|---|---|---|---|---|---|
| | $s_1$ | $s_2$ | 1.5 | 2.0 | 2.5 | 3.0 | 3.5 |
| Binomial Coefficients | .167 | .667 | 1.7 | 6.0 | 13.6 | 24.0 | 34.0 |
| Tapered Sensitivities | .189 | .686 | .113 | | | | |
| Do | .24 | .725 | | 1.0 | | | |
| Do | .315 | .765 | | | 3.0 | | |
| Do | .40 | .80 | | | | 5.77 | |
| Do | .50 | .83 | | | | | 9.6 |
| Uniform Sensitivities | 1.0 | 1.0 | 20.0 | 20.0 | 25.0 | 25.0 | 25.0 |

The foregoing table represents values obtained, by way of example, by combining the output of a group of five transducers in alignment with the shot point. It will be observed that in each instance the percentage amplitude for a given band width is very substantially less than the values obtained by determining relative sensitivity on the basis of binomial coefficients, or when the transducers are of uniform sensitivity. It is obvious, therefore, that sensitivity values falling within the limits defined on the one hand by binomial coefficients, and on the other hand by unity, produce beneficial results, although maximum effectiveness is achieved by the selection of values coinciding generally with the values obtained by the use of the foregoing formulae. It may be explained that when using the present system of tapered sensitivity, a different value of percentage amplitude is given for each of the representative band widths in the foregoing table because, in the practice of the present invention and in the use of the foregoing formulae, the relative sensitivity is a function of the band width. In other words, the sensitivity will differ for different band widths, as the table indicates.

It is of interest to note, from the column headed "Sensitivities" in the foregoing table that in the practice of the instant invention the drop in transducer sensitivity, proceeding outwardly from the center of a row of transducers, is greater as the band width is reduced. Thus, in the table, the ratio of sensitivities for a band width of 1.5 is not very much less than in a system based on the use of binomial coefficients. On the other hand, as the band width increases, there is less difference in the sensitivity of adjacent transducers until, with a band width of 3.5, the sensitivity ratio is much nearer unity. This supports the fact, hereinbefore stated, that when the sensitivities of transducers are selected on the binomial coefficient theory, the system is no longer effective to reject unwanted energy over a continuous band, but only over a band width, as defined herein, of unity. At the other end of my range, where the selected band width is greatest, the relative sensitivities approach (and may even exceed) unity, and it is therefore obvious that a system of uniform sensitivities is relatively ineffective to reject unwanted energy over a finite band of wave lengths.

In this connection, it may be pointed out that if it is desired to attenuate over very wide band widths, at some sacrifice in attenuation, in systems employing not less than five transducers in a line or row, the outermost transducers may have sensitivity values substantially greater than that of the central transducer or transducers. In other words, the sensitivity curve, in the case of a wide band, passes through unity and beyond, so that there is a progressive increase of sensitivity toward the middle of the line or row only if the outermost transducers at each end be disregarded.

By way of example, if $x=4$ when $N=5$, $s_1=s_2$; the ratio of sensitivity of the two outermost transducers will thus be unity. Again, if $x=6$ when $N=5$, it will be apparent that $s_1=1.38$ and $s_2=0.923$, when the center transducer has a sensitivity value of 1.0. The use of my formulae in the attenuation of such large band widths is of limited application, but is highly useful under some conditions, and is contemplated as part of the invention.

The comparative effects of systems employing transducers (a) of uniform sensitivity, (b) of sensitivity varying as binomial coefficients, and (c) tapered sensitivities as in the instant invention, is illustrated generally in Figure 1 of the drawing, in which the abscissae represent band width (W) as defined herein, and the ordinates are a measure of amplitude within the selected band, and more particularly, the value A, which is defined hereinbefore. It will be appreciated that for a given value of A, the instant system provides attenuation over a substantially greater band width than either of the remaining methods or, alternatively, that for a given band width, far more effective attenuation can be achieved by the present system.

Figure 2, in which similar abscissae and ordinates are used, represents the effect achieved by the practice of the present invention with different numbers of transducers in the group, illustrating the statement hereinbefore made that, in this system as in others, greater attenuation results as the number of transducers is increased.

The spacing between adjacent transducers is a function of the maximum and minimum wave lengths in the selected band, as given by the following formula:

$$D=\frac{L_L}{W+1}$$

in which D is the distance between the effective centers of adjacent transducers in the group, $L_L$ is the longest wave length in the band, and W is the band width, or the ratio between the longest and shortest wave lengths in the band. Assuming, therefore, that the maximum and minimum wave lengths have been determined, the spacing between transducers may readily be calculated to give the best results.

As hereinbefore indicated, one or more of the variables may be arbitrarily selected. For instance, it may be found desirable to employ a given number of transducers in a group, or in a row of a group including a number of rows, in which event the formulae applicable to that number of transducers may readily be applied to obtain the best possible rejection of unwanted signals over a band width found to be desirable from an inspection of earlier records or of preliminary test records. In general, the greater the number of transducers in a group, the more efficient the suppression of unwanted signals, but as hereinbefore pointed out, there are practical limits of convenience and expense which tend toward a reduction in the total number of transducers used, and it can be shown that regardless of the number of transducers employed, the efficiency can be very materially improved by adjusting the relative sensitivities as contemplated herein.

Although the foregoing formulae assume that all transducers in a group are connected to give the same polarity, the same formulae are applicable to an arrangement in which the polarity is to be alternated within the group, adjacent transducers being connected in opposition. A system employing identical polarities tends to attenuate all energy in the selected band down to the desired level, whereas alternating polarities essentially attenuate energy outside of the selected band.

The same formulae apply also to patterns other than straight lines. For example, if five transducers are to be used down the line and five transducers at right angles to the line and if the value of $s_1$ and $s_2$ required to give the desired attenuation and band width are $s_1=.40$, $s_2=.80$, then for five transducers in line this would be:

$$.40 \quad .80 \quad 1.0 \quad .80 \quad .40$$

or the ratio is:

$$2 \quad 4 \quad 5 \quad 4 \quad 2$$

If this is to attenuate similarly a band arriving in a direction normal to the line, then the pattern from right angles to the line will be the same as that down the line, or:

$$\begin{matrix}2\text{-}4\text{-}5\text{-}4\text{-}2\\4\\5\\4\\2\end{matrix}$$

The next line will then have the same ratio as the first:

$$\begin{matrix}2\text{-}4\text{-}5\text{-}4\text{-}2\\4\text{-}8\text{-}10\text{-}8\text{-}4\\5\\4\\2\end{matrix}$$

and the complete pattern will be:

$$\begin{matrix}2\text{-}4\text{-}5\text{-}4\text{-}2\\4\text{-}8\text{-}10\text{-}8\text{-}4\\5\text{-}10\text{-}12\tfrac{1}{2}\text{-}10\text{-}5\\4\text{-}8\text{-}10\text{-}8\text{-}4\\2\text{-}4\text{-}5\text{-}4\text{-}2\end{matrix}$$

Converting this to percentage sensitivity and setting the maximum value (12½) equal to 100%, 10 will then be 80%, 8 will be 64%, 5 will be 40%, 4 will be 32%, 2 will be 16%, so the pattern will be:

16%–32%–40%–32%–16%
32%–64%–80%–64%–32%
40%–80%–100%–80%–40%
32%–64%–80%–64%–32%
16%–32%–40%–32%–16%

It will be noted that the first column is identical with the first row, the second column with the second row, etc., and that the total of the first column is 136, the second 272, third 340, fourth 272, fifth 136, this being the ratio of 2, 4, 5, 4, 2.

Another example of an area is as follows: Assume that four transducers will give ample attenuation over the band and the sensitivity $s$ turns out to be .50, then the linear pattern is:

$$0.5 \quad 1.0 \quad 1.0 \quad 0.5$$

and the ratio is:

$$1\text{-}2\text{-}2\text{-}1$$

Making the first column the same as the first row, we get:

$$\begin{matrix}1\text{-}2\text{-}2\text{-}1\\2\\2\\1\end{matrix}$$

The second line should have the same ratio but starting with 2 instead of 1, so we would get:

$$\begin{matrix}1\text{-}2\text{-}2\text{-}1\\2\text{-}4\text{-}4\text{-}2\\2\\1\end{matrix}$$

Filling out the pattern:

$$\begin{matrix}1\text{-}2\text{-}2\text{-}1\\2\text{-}4\text{-}4\text{-}2\\2\text{-}4\text{-}4\text{-}2\\1\text{-}2\text{-}2\text{-}1\end{matrix}$$

Converting back to sensitivity, 4=100%, 2=50%, 1=25%, so:

25%–50%–50%–25%
50%–100%–100%–50%
25%–50%–50%–25%

The foregoing formula and other data are based on uniform spacing of transducers and/or explosive charges. Data can, of course, be computed for any spacing other than uniform but the calculations are quite involved. Furthermore, uniform spacing gives the best continuous band of attenuation, since non-uniform spacing produces separated cancellation points or separated bands of attenuation. These may be useful for specific applications but do not possess the advantages of providing a uniform band of substantial width, ease of use of formulae, and general utility.

Disturbing energy, shear waves, ground roll, etc., are not continuous waves but are transients containing a wide range of wave lengths. The onset usually contains shorter wave lengths than the predominating wave lengths and the tailing energy is usually longer in wave length. These shorter and longer wave lengths may be difficult to recognize in the presence of the predominating energy but will often disturb the record if the predominating energy is removed. Filters can and should be used, of course, in the amplifier, transducer, and/or recorder to remove disturbing frequencies outside of the useful reflection frequency range.

When disturbing energy is reflected or refracted from a surface anomaly, the wave length appears to be the same if observed in the direction of its propagation, but will have a much longer apparent wave length at an angle to its new direction of propagation.

It will be understood that the combining or compositing of the transducer outputs can be effected in any convenient manner, for instance, as described in my prior patent, No. 2,348,409, granted May 9, 1944. It will also be appreciated that reference herein to adjustment of sensitivity is not intended as unduly restrictive of the method or means by which comparable adjustment may be effected within the skill of those conversant with the art. Thus, adjustment may be made at the transducer, or in the line connecting the transducers with the amplifying and recording equipment, or within the latter. Again, when the seismic energy is received by a series of transducers of substantially equal sensitivity, recorded, and thereafter reproduced from the recording, for instance, for the purpose of compositing, the instant invention may thereafter be utilized to alter the relative amplitude of the several traces by appropriate adjustment of the reproducing equipment. Such variations are deemed the full equivalent of the preferred method and means described herein.

The principle of my invention is also applicable to systems involving the firing of multiple charges, the amount of the several charges being varied in conformity with the general and specific formulae hereinbefore set forth. Thus, I may use a plurality of shot holes in a line, adjusting the several charges so that their relative explosive force varies progressively from the outermost charges at each end of the line toward the center of the line. Alternatively, I may arrange a plurality of charges in a pattern, as described hereinbefore in connection with the arrangement of transducers in a pattern, the arrangement and intensity of the charges being such that the total effect can readily be reduced to an equivalent straight line pattern, applying the formulae hereinbefore set forth. In calculating the relative intensity of the charges, where this method is employed, the definition of the terms appearing in the formulae will be as follows:

$N$ = the number of shot points in line which are shot simultaneously.
$D$ = distance between effective centers of adjacent shot points in the group.
$L$ = wave length of horizontally propagated energy.
$R$ = ratio of the combined horizontal energy when shot points are spaced in the selected pattern to the horizontal energy resulting from a single charge with the same total energy located at the center of the pattern for any given value of L.
$s_1$ = the ratio of the effectiveness of the outermost charge to the effectiveness of the center charge (or central pair of charges).
$s_2$, $s_3$, $s_4$, etc. are the ratios of the remaining charges from the end to the center.
$n$ = the numerical order of a given charge in a group, etc.
$x$, $W$ and $A$ are as given hereinbefore.

As a further alternative, I may employ a plurality of tapered charges, spaced vertically in a shot hole, and fire the charges in rapid sequence. In this event, the brief time interval elapsing between the firing of consecutive charges may be computed by selecting the time interval to give the desired equivalent horizontal spacing, taking into consideration in making the calculation the velocity of propagation of seismic energy in the medium around the charge. The vertical spacing of the charges may then be selected to make the downward detonation rate approximately equal to the downward velocity of propagation of sound in the medium around the charge. Consecutive firing can readily be arranged by the use of delay caps, delay couplers, or of fuses of various length for firing the several charges, these methods of shooting multiple charges in rapid sequence in a single hole being well known.

Obviously, combinations of the aforementioned methods may be employed to advantage. Thus I may use concurrently a plurality of detectors of which the response varies as proposed herein, and a plurality of charges of which the intensity is varied as herein taught in which event the effectiveness of the invention is enhanced materially.

It will be appreciated that my invention has a wide field of application and that the principles outlined herein may be put into practice in a variety of methods, and by the use of apparatus which varies widely. Such modifications of the invention as are described herein, and as would normally occur to those skilled in the art as an obvious development of the preferred embodiment, are contemplated as part of the invention.

Having thus described the invention, what is claimed as new and desired to be secured by Letters Patent is:

1. In a method of seismic surveying in which seismic energy is detected and converted into electrical energy by a row of at least three transducers of which the outputs are combined for the recording of a composite signal, the step which comprises adjusting the sensitivity of the transducers to establish a progressively increasing sensitivity from the transducers at each end of the row toward the center of the row, the progressive increase in sensitivity being less than that of binomial coefficients of an expansion in which the exponent is one less than the number of transducers in the row, whereby unwanted energy within a continuous band of wave lengths is substantially attenuated.

2. The method of claim 1 in which the sensitivities of the transducers are adjusted substantially to the values derived from the formulae appearing in the specification under the heading "General formulae."

3. The method of claim 1 in which the outputs of alternate transducers in the row are combined substantially in opposed phase relation.

4. In apparatus for use in seismic surveying, the combination with a group of at least three transducers arranged in a row, of means combining the outputs of said transducers for the recording of a composite signal, the sensitivity of the transducers progressively increasing from each end toward the center of the row, the progressive increase in sensitivity being less than that of binomial coefficients of an expansion in which the exponent is one less than the number of transducers in the row, whereby unwanted energy within a continuous band of wave lengths is substantially attenuated.

5. Apparatus as claimed in claim 4 in which the sensitivities of the transducers are adjusted substantially to the values derived from the formulae appearing in the specification under the heading "General formulae."

6. Apparatus as claimed in claim 4 in which the sensitivities of the transducers are adjusted substantially to the values derived from the formulae appearing in the specification under the heading "Specific formulae."

7. In apparatus for use in seismic surveying, the combination with a group of transducers arranged in a plurality of parallel rows, there being at least three transducers in each row, the number of rows equaling the number of transducers in each row, whereby the transducers are arranged in rows and columns, of means combining the outputs of said transducers for the recording of a composite signal, the sensitivity of the transducers progressively increasing in each row from each end toward the center of the row, and in each column from each end toward the center of the column, the progressive increase in sensitivity being less than that of binomial coefficients of an expansion in which the exponent is one less than the number of transducers in a row, whereby unwanted energy within a continuous band of wave length is substantially attenuated.

8. In a method of seismic surveying in which seismic energy is detected and converted into electrical energy by a row of at least five transducers of which the outputs are combined for the recording of a composite signal, the step which comprises adjusting the sensitivity of the transducers to establish a progressively increasing sensitivity from the transducers immediately adjacent the transducers at each end of the row toward the center of the row, the progressive increase in sensitivity being less than that of binomial coefficients of an expansion in which the exponent is one less than the number of transducers in the row, whereby unwanted energy within a continuous band of wave lengths is substantially attenuated.

9. The method of claim 8 in which the sensitivities of the transducers are adjusted substantially to the values derived from the formulae appearing in the specification under the heading "General formulae."

10. The method of claim 8 in which the sensitivities of the transducers are adjusted substantially to the values derived from the formulae appearing in the specification under the heading "Specific formulae."

11. In a method of seismic surveying in which seismic energy initiated by the firing of a plurality of explosive charges is detected at a remote station and converted into electrical energy, arranging the charges in spaced relation in at least one line, and adjusting the size of the charges to establish a progressively increasing intensity from the charges at each end of the line toward the center of the line, the progressive increase in intensity being less than that of binomial coefficients of an expansion in which the exponent is one less than the number of charges in the line, whereby unwanted energy within a continuous band of wave lengths is substantially attenuated at the remote station.

12. The method of claim 11 in which the sensitivities of the charges are adjusted substantially to the values derived from the formulae appearing in the specification under the heading "General formulae."

13. The method of claim 11 in which the sensitivities of the charges are adjusted substantially to the values derived from the formulae appearing in the specification under the heading "Specific formulae."

References Cited in the file of this patent

UNITED STATES PATENTS

| Number | Name | Date |
|---|---|---|
| 2,396,222 | Foldy | Mar. 5, 1946 |
| 2,473,469 | Dahm | June 14, 1949 |
| 2,580,636 | Wolf | Jan. 1, 1952 |